(12) United States Patent
Lee

(10) Patent No.: US 6,380,671 B1
(45) Date of Patent: Apr. 30, 2002

(54) FED HAVING A CARBON NANOTUBE FILM AS EMITTERS

(75) Inventor: Chun-Gyoo Lee, Kyungki-do (KR)

(73) Assignee: Samsung SDI Co., Ltd., Kyung-do (KR)

( * ) Notice: Subject to any disclaimer, the term of this patent is extended or adjusted under 35 U.S.C. 154(b) by 0 days.

(21) Appl. No.: 09/533,202

(22) Filed: Mar. 23, 2000

(30) Foreign Application Priority Data

Jul. 16, 1999 (KR) .............................................. 99-28997

(51) Int. Cl.⁷ .................................................. H01J 1/62
(52) U.S. Cl. ....................................... 313/495; 313/310
(58) Field of Search ................................ 313/310, 495, 313/311

(56) References Cited

U.S. PATENT DOCUMENTS 5,726,524 A   3/1998   Debe ........................... 313/309

*Primary Examiner*—Vip Patel
(74) *Attorney, Agent, or Firm*—Charles, Parker & Hale, LLP

(57) ABSTRACT

An electric field emission device includes a set of parallel strip-shaped cathode electrodes on the back substrate, on which a film of carbon nanotube is deposited as electron emitting material. Electrons are emitted from the carbon nanotube film in response to an electric field it comes under when a cathode electrode and a grid electrode, which is disposed on the bottom surface of a grid plate spaced apart from the back substrate, are applied with data and scan signals respectively.

8 Claims, 3 Drawing Sheets

FED HAVING A CARBON NANOTUBE FILM AS EMITTERS

FIELD OF THE INVENTION

The invention relates to a field emission display device including a carbon nanotube film on cathode electrodes such that the film emits electrons under the influence of electric field between the cathode electrodes and grid electrodes.

BACKGROUND OF THE INVENTION

FIG. 1 shows a conventional flat CRT. Line cathodes of tungsten as thermionic electron source are placed on a substrate. Scan electrodes and data electrodes are formed on either side of a glass plate having a plurality of through-holes at pixel locations. The electrodes with predetermined voltages applied thereto selectively pass the electrons emitted from the line cathode so that the electrons accelerate toward a screen and collide with phosphors coated on the inner surface of the screen. Here, the use of line cathodes limits the size of the display screen because the line cathodes of tungsten in a large display are more likely to vibrate and thus emission of electrons from becomes irregular. Moreover, heat generated from the line cathode may cause the electrode grid pate to deform resulting in unstable display images. It fails to teach the use of carbon nanotube as a source of electrons. In fact simple substitution of line cathodes with carbon nanotube is impossible since the former must be heated to emit electrons while the latter emit electrons when subjected to an electric field of a certain magnitude.

The use of carbon nanotube or the like has been suggested in a US patent to Debe (5,726,524). FIG. 3a of the patent teaches a patterned microstructure on a row electrode so that when voltage is applied between the row electrode and the column electrode electrons are emitted from the cathode to eventually hit the phosphor layer under the column electrodes. A drawback of this structure is that a high voltage potential can not be provided since the difference between the signal electrodes are well known not to exceed 300 V at best. In other words the maximum voltage difference is 600 V. This requirement is a cause of low brightness and short life span. Another FED structure shown in FIG. 3b uses gated electrodes and micro tip cathodes, to which switching signals are applied and electrons emitted are accelerated toward the phosphor screen by a high constant voltage of as much as 4KV potential at the anode. However, such an FED structure needs a complicated thin film process of repeatedly depositing material on a substrate and etching a predetermined pattern corresponding to pixels in order to grow gate electrodes and cathodes on a same substrate.

SUMMARY OF THE INVENTION

An objective of the present invention is to allow a large screen FED to have stable electron emission by a novel FED structure of carbon nanotube as a source of the electrons.

Another objective of the invention is to allow a large screen FED to be made without a complicated process of a prior art by separately providing a cathode layer and a grid layer.

DETAILED DESCRIPTION OF THE INVENTION

Figure 1:
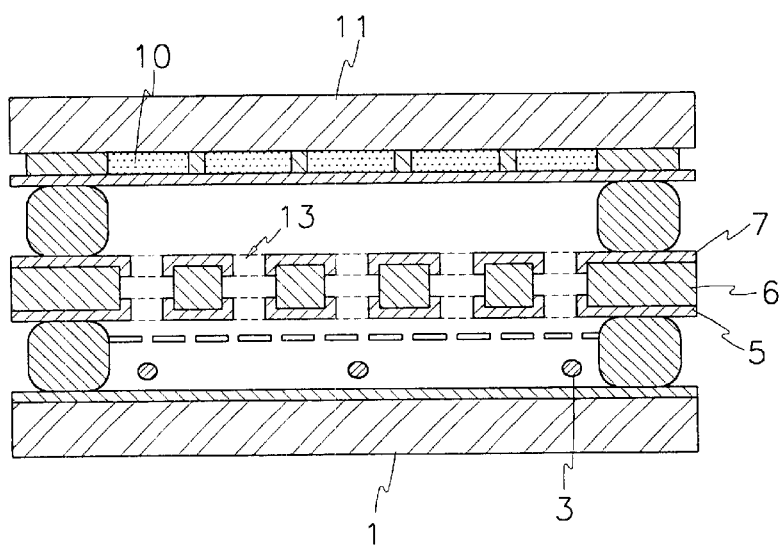
FIG. 1 is a conventional a flat CRT structure.
Figure 2:
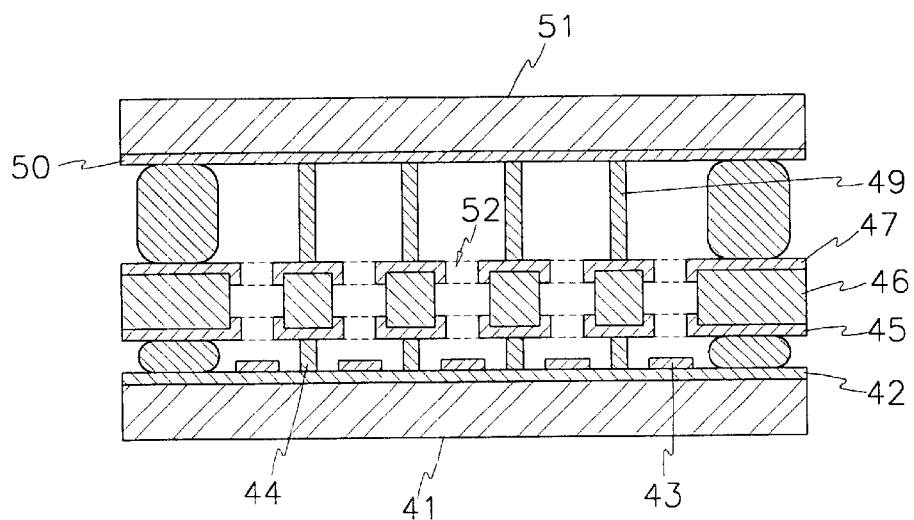
FIG. 2 is a cross section of an FED according to a first embodiment of the present invention.
Figure 3:
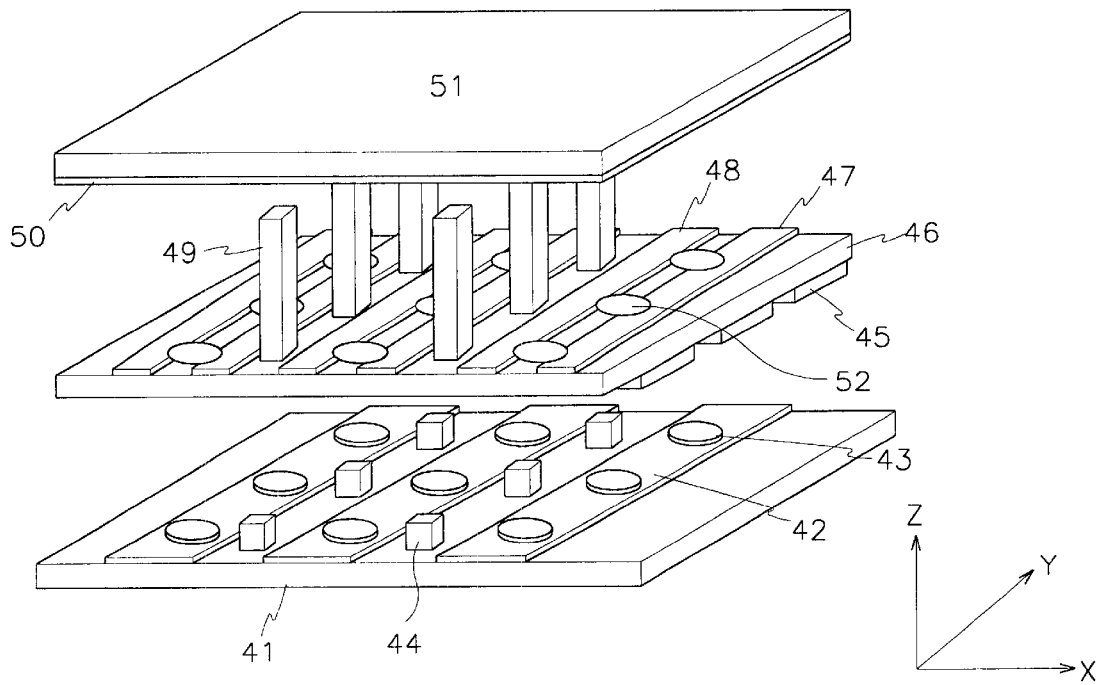
FIG. 3 is an exploded view of an FED according to a first embodiment of the present invention.

FIG. 3 illustrates an embodiment of the present invention in an FED.

The inventive FED is comprised of a substrate (41), a grid plate (46) and a screen substrate (51). A plurality of strip-shaped cathode electrodes are formed in the Y-direction on the top surface of the substrate and field emission materials (43) are coated on the cathode electrodes at pixel positions (43). The grid plate is defined here as a plate physically separated from the base plate such that the grid electrode on the bottom surface of the plate is spaced apart from any portion of the base substrate including any bonded layer on top of it. This is contrast to a prior art FED where gate electrodes are integral with the substrate since it is deposited on an insulating layer which is also laminated on the cathode electrodes. The grid plate has a plurality of through-holes at locations corresponding to the pixels. The through-holes can be made by using a photolithography on the grid plate made of a photosensitive glass. On the bottom surface of the plate is formed a plurality of first strip-shaped grid electrodes in the X-direction, i.e., perpendicular to the Y-direction. A plurality of second grid electrodes are optionally formed on the top surface of the grid plate. Here the second electrodes formed on either side of a row of through-holes function in a pair to deflect the path of electrons coming out of the through-holes such that they collide with a desired phosphor pattern on the screen plate. The second electrodes is helpful in a high resolution display because the fabrication requires minimum hole pitch and thus can not make enough holes to be equal to the number of pixels. With deflection electrodes an electron beam out of a single through-hole can be selectively deflected to hit one of multiple phosphors, i.e., three phosphors. Spacers are erected between the grid plate and the screen plate in order to maintain a predetermined gap between the two plates against the atmospheric pressure. An advantage of the present invention particularly lies in the ease of forming cathodes and electron emitting material on top of it. It is reminded that there is no need to form an insulating layer and etching a predetermined portions of it to provide microtip electron emitting structure as is required in the prior art. The electron emitting material is preferably carbon nanotube. It can be seen that cathode electrodes can be formed by simply printing a metal material on a substrate and an electron emitting material right on top of it. Likewise the grid electrodes, i.e., scan signal electrodes, can be formed on a surface of a grid plate by a printing method. The cathode electrodes and the grid electrodes can function as data and scan signal electrodes respectively in a matrix driving scheme. Of course other known methods such as vapor deposition can be used. The grid plate and the substrate plate are made independently. Since the present invention further employs carbon nanotube as a source of electron emission the inventive FED is more reliable and has uniform brightness than that of the flat CRT using tungsten line cathodes described above.

In operation, data and scan signal are applied to the cathode electrodes and gird electrodes respectively. At pixel positions, which are basically intersections of the electrodes, an electric field is generated in case that there is a voltage potential difference between the two intersecting active electrodes. In response to a voltage difference exceeding a certain magnitude carbon nanotube emits electrons. Because the grid plate and the base plate are placed close together in the order of 30–200 µm a low voltage signal can be used to generate a sufficient electric field for electrons to be emitted from the carbon nanotube layer. Such a distance can be maintained by spacers formed by a known printing method. These electrons pass through-holes in the grid plate and are accelerated by the anode voltage between the grid plate and the phosphor screen to finally collide with a phosphor layer coated on the bottom surface of the screen plate resulting in light emission at corresponding pixels. The second grid electrodes 45 on the bottom surface of the grid plate serves the function of deflecting electrons so that the electrons land at desired phosphor locations. Though the described embodiment was described as having cathode electrodes applied with data signals and the grid electrodes with scan signals, it is well within the skill of one versed in the field to interchange them with minor modifications and thus detailed description of it won't be made here On the other hand in order to provide desired brightness a higher voltage potential difference is to be applied between the grid electrodes and the screen plate. This requirement necessitates a greater distance between the grid and the screen than that between the grid and the substrate. High-aspect ratio spacers can be provided between the plates by anodic bonding. Or spacers may be inserted in the grid plate for stability.

Figure 4:
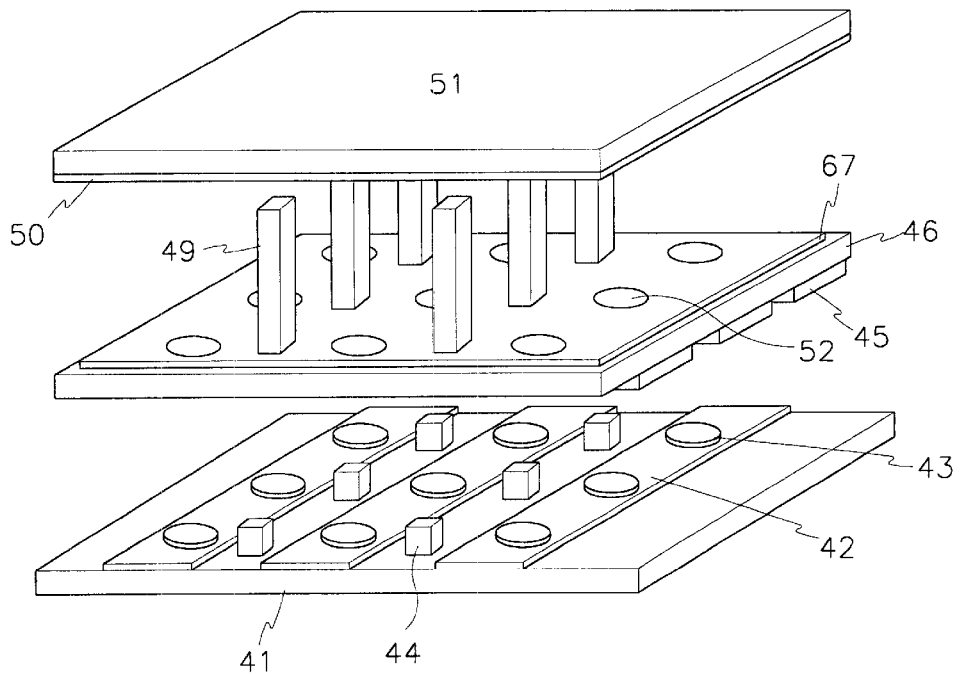
FIG. 4 is an exploded view of an FED according to a second embodiment of the present invention.

FIG. 4 shows a second embodiment of the present invention. This differs from the first embodiment in that the second grid electrodes on the top surface of the grid come in the form of a film covering all the surface except for the through-holes. This embodiment is suitable for a low resolution display, which does not need to deflect electrons. In this embodiment the second electrodes perform a function of accelerating and focusing the electron beams.

Figure 5:
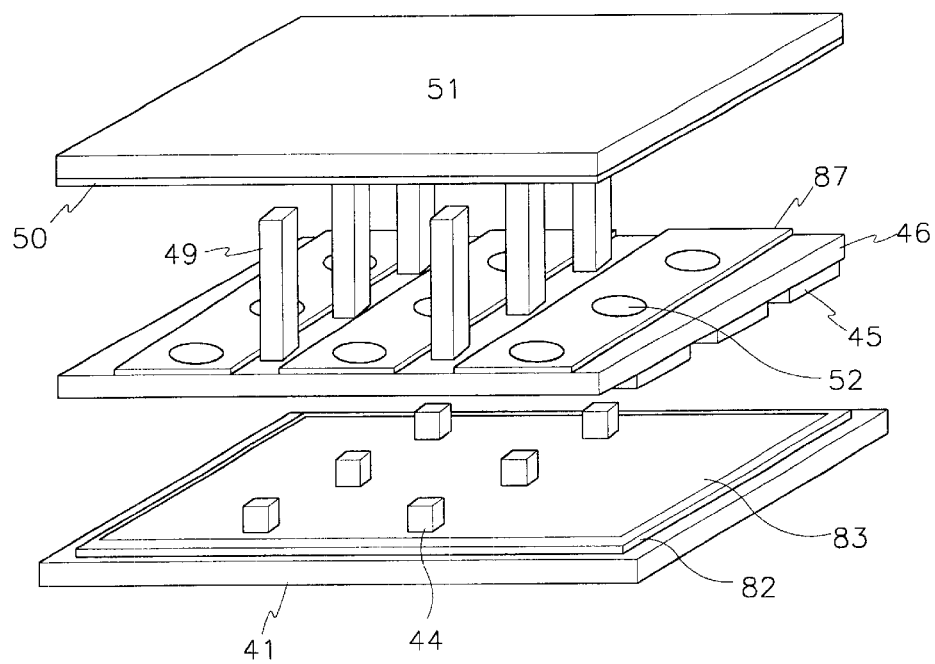
FIG. 5 is an exploded view of an FED according to a third embodiment of the present invention.

FIG. 5 shows a third embodiment of the present invention, where it is easier to print electron emitting material in the base substrate since it is in the form of a film disposed over the entire base substrate surrounded by a cathode electrode and thus it does not require rather complicated process of patterning the material in a stripe pattern. For a matrix driving, the first and second grid electrodes can be applied with data and scan signals respectively while the cathode layer is maintained at the ground potential.

Figure 6:
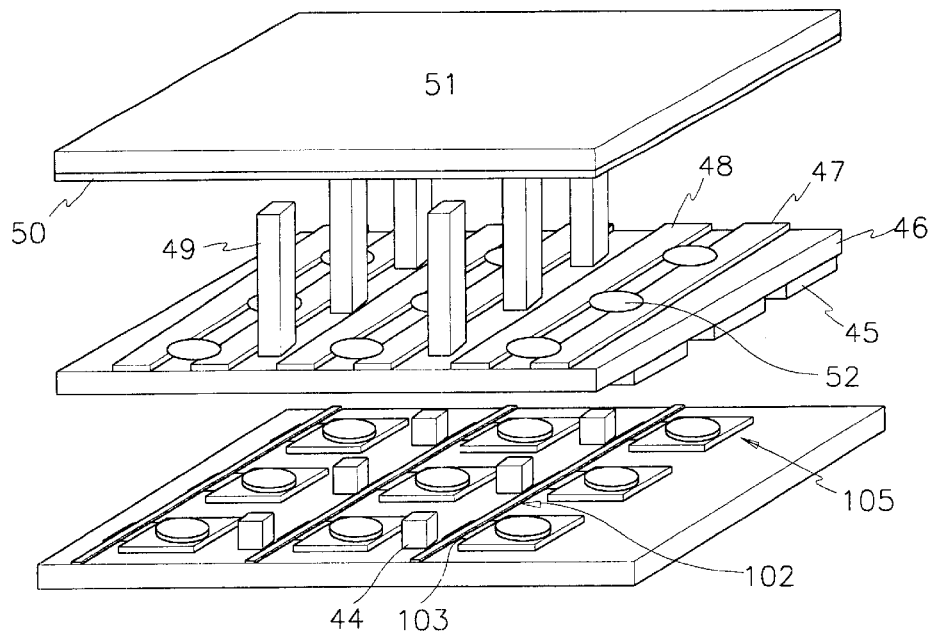
FIG. 6 is an exploded view of an FED according to a fourth embodiment of the present invention.

FIG. 6 shows a fourth embodiment of the present invention. The amount of electrons emitted under an electric field is highly dependent on factors such as the surface relief of a cathode material and the distance to the extraction electrodes. Thus uniform emission of electrons from all the pixels is hard to obtain. It has been known that providing resistance between the cathode and emitting material helps to obtain uniform electron emission. Every carbon nanotube-printed area at pixel locations is coupled to cathode electrodes via a resistive means so that decrease in electron emission from those of pixels that otherwise would emit more electrons than others is greater than that of pixels that otherwise would emit less. With resistance provided between the cathode and carbon nanotube pixels electron emission now becomes uniform from pixel to pixel. In other words pixels will have uniform brightness.

What is claimed is:

1. A field emission display comprising:

a base substrate having a surface with a cathode electrode and carbon nanotube film; and a grid plate having holes therethrough and a plurality of mutually parallel strip-shaped grid electrodes, the grid plate being spaced apart from the base substrate.

2. The field emission display of claim 1 wherein the carbon nanotube film is disposed on the surface of said cathode electrode.

3. The field emission display of claim 1 wherein the carbon nanotube film is surrounded by the cathode electrode.

4. The field emission display of claim 1 further comprising spacers between the base substrate and the grid plate.

5. The field emission display of claim 1 wherein said cathode electrode has a strip shape.

6. The field emission display of claim 5 wherein a direction of said strip-shaped cathode electrode is perpendicular to a direction of said grid electrodes such that an area intersected by the cathode electrode and the grid electrodes comprises pixels in said field emission display.

7. The field emission display of claim 1 further comprising resistive means between the cathode electrode and the carbon nanotube film.

8. The field emission display of claim 1 wherein the base substrate further comprises a plurality of cathode electrodes.

* * * * *